(12) United States Patent
Arthur et al.

(10) Patent No.: US 6,926,768 B2
(45) Date of Patent: Aug. 9, 2005

(54) TREATMENT OF HIGH PERFORMANCE PIGMENTS

(75) Inventors: Kevin A. Arthur, West Chester, OH (US); George H. Robertson, Loveland, OH (US); George McLaren, Mason, OH (US); Stanislav G. Vilner, Mason, OH (US); Ronald R. Forbes, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 282 days.

(21) Appl. No.: 10/412,902

(22) Filed: Apr. 14, 2003

(65) Prior Publication Data

US 2004/0200387 A1 Oct. 14, 2004

(51) Int. Cl.[7] .............................................. C09B 67/18
(52) U.S. Cl. ........................ 106/493; 106/410; 106/412; 106/494; 106/495; 106/496; 106/497; 106/498; 106/499; 516/203
(58) Field of Search ................................. 106/410, 412, 106/493, 494, 495, 496, 497, 498, 499; 516/203

(56) References Cited

U.S. PATENT DOCUMENTS

| | | | |
|---|---|---|---|
| 4,047,436 A | 9/1977 | Bernard et al. | 73/362 SC |
| 4,057,436 A | 11/1977 | Davies et al. | 106/288 Q |
| 4,057,463 A | 11/1977 | Morita | 176/22 |
| 4,398,955 A | 8/1983 | Stansfield et al. | 106/23 |
| 4,461,647 A | 7/1984 | Schofield et al. | 106/308 N |
| 4,518,435 A | 5/1985 | Stansfield et al. | 106/308 N |
| 4,518,438 A | 5/1985 | Storen | 134/22.1 |
| 4,894,094 A | 1/1990 | Ruff et al. | 106/496 |
| 4,981,489 A | 1/1991 | Ruff et al. | 8/641 |
| 5,021,090 A | 6/1991 | Schwartz et al. | 106/23 |
| 5,024,698 A | 6/1991 | Schwartz et al. | 106/20 |
| 5,062,894 A | 11/1991 | Schwartz et al. | 106/23 |
| 5,725,649 A | 3/1998 | Marr | 106/411 |
| 5,837,045 A | 11/1998 | Johnson et al. | 106/31.85 |
| 5,942,368 A | 8/1999 | Akiyama et al. | 430/176 |
| 5,944,833 A | 8/1999 | Ugon | 713/400 |
| 6,013,124 A | 1/2000 | Saibara et al. | 106/31.86 |
| 6,287,348 B1 * | 9/2001 | Bruhnke | 8/543 |
| 6,471,764 B1 | 10/2002 | Robertson et al. | 106/493 |

FOREIGN PATENT DOCUMENTS

JP 11323166 A 11/1999 ............ C09B/67/20

OTHER PUBLICATIONS

The Jeffamine Polyoxyalkyleneamines; Technical Bulletin Huntsman; 2002; pp. 1–6; XP002300536, no month.

\* cited by examiner

*Primary Examiner*—Anthony J. Green
(74) *Attorney, Agent, or Firm*—Sidney Persley

(57) ABSTRACT

A pigment's etheramine sulfonic acid salt is described. Also described is a method for enhancing the performance of a pigment composition containing an organic pigment, comprising enhancing the dispersion of said pigment by adding to 100 parts of said pigment about 1 to 40 parts of a pigment's etheramine sulfonic acid salt.

13 Claims, No Drawings

TREATMENT OF HIGH PERFORMANCE PIGMENTS

FIELD OF THE INVENTION

This invention relates to dispersions of dyestuffs and pigments in organic liquids.

BACKGROUND OF THE INVENTION

There is a need in the area of solvent dispersion of organic pigments for products of lower viscosity and improved transparency and gloss. This is particularly true in the area of solvent inks designed for packaging applications. The solvents used for this type of application include the oxygenated types such as alcohols (ethanol, propanols), esters (ethyl acetate, ispropyl acetate) and ethers (mono methyl ether of propylene glycol), or mixtures of such solvents. Typical resins dissolved in these solvents are nitrocellulose, polyamide, polyurethane or polyvinyl butyrate.

U.S. Pat. Nos. 4,057,436 and 4,518,435 disclose that dispersions of greatly increased fluidity can be produced by use of certain salts formed by the reaction between amines or quaternary ammonium salts and colored acids. However, these salts are not alkoxylated and are limited to the tertiary and quaternary amine types.

U.S. Pat. No. 6,471,764 discloses a method for enhancing the performance of a pigment composition containing an organic pigment, comprising enhancing the dispersion of said pigment by adding to 100 parts of said pigment about 1 to 30 parts of a specific pigment's etheramine sulfonic acid salt. However, the etheramine sulfonic salt disclosed is different than the one described hereinbelow which leads to inconsistent improvement in performance at least with regard to improvement in transparency as indicated in Table 2 of this patent.

The present invention provides for ink bases with excellent flow with good gloss and improved transparency over the ink bases of the prior art.

SUMMARY OF THE INVENTION

The present invention relates to an etheramine salt of the formula:

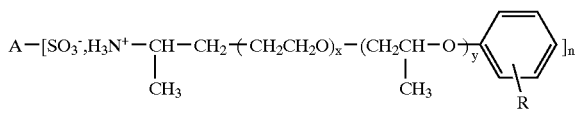

wherein A is an organic pigment residue, x and y each is an integer from 0–30 with x+y≧10, R is an alkyl group of 2–18 carbon atoms and n is a number between 1 and 4.

The present invention also relates to a method for enhancing the performance of a pigment composition containing an organic pigment, comprising enhancing the dispersion of said pigment by adding to 100 parts of said pigment about 1 to 40 parts of an etheramine salt of the formula:

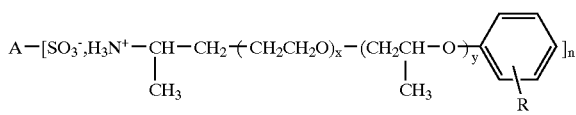

wherein A is an organic pigment residue, x and y each is an integer from 0–30 with x+y≧10, R is an alkyl group of 2–18 carbon atoms and n is a number between 1 and 4.

DETAILED DESCRIPTION OF THE INVENTION

It has now surprisingly been found that the addition of an etheramine salt of the formula:

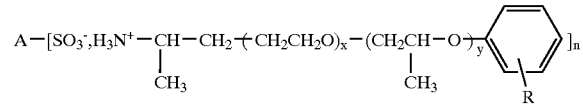

wherein A is an organic pigment residue, x and y each is an integer from 0–30 with x+y≧10, R is an alkyl group of 2–18 carbon atoms and n is a number between 1 and 4, to an organic pigment enhances the dispersion of this organic pigment and greatly increases its fluidity. The etheramine salt of the invention can be added to either a dry or a fluidized organic pigment or prepared in the presence of the organic pigment. The organic pigment residue A and the organic pigments in the dispersion can be different but preferably are identical or very similar. The organic pigment whose increased dispersion is desired is preferably substantially insoluble in organic liquid. Also preferably, each of the organic pigment residue A and the organic pigment to be dispersed is independently selected from the group consisting of phthalocyanine, perylene, quinacridone, azo and dioxazine. Both the organic pigment residues A and the organic pigments to be dispersed may be mixtures. Most preferably, each of the residue A and organic pigment is phthalocyanine.

The etheramine salt of the invention is formed by the reaction between a sulfonic acid group in an organic pigment residue with an ether amine having the following formula:

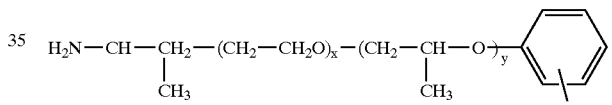

wherein x and y each is an integer from 0–30 with x+y≧10 and R is an alkyl group of 2–18 carbon atoms, followed by isolating the etheramine salt by filtration. The synthesis of the etheramine salt of the present invention can also take place in the presence of the organic pigment whose increased dispersion is desired.

The present invention also provides for a pigment composition comprising 1–40 parts of the etheramine salt of the present invention and about 100 parts of an organic pigment.

The composition of the present invention can be obtained by any of the conventional and well known methods of preparing dispersions. Preferably, a process for preparing a beta crystal copper phthalocyanine pigment composition comprises treating aqueous slurry of a beta crystal copper phthalocyanine pigment with copper phthalocyanine sulfonic acid at a pH between 2–8 followed by addition of the etheramine or mixture of etheramine and quaternary ammonium chloride. The product is then removed by filtration and dried.

As a variation on this, the copper phthalocyanine sulfonic acid may be slurried in water at pH 1–10 and the etheramine or etheramine and quaternary ammonium chloride added to this slurry. This slurry is then added to the aqueous pigment slurry. The copper phthalocyanine pigment may be produced by any of the known arts, such as grinding with salt and glycol or dry grinding, with or without salt, and solvent treating to produce the beta crystal form. The dispersions containing this etheramine salt may be prepared in the ink system by either adding the previously prepared composition of pigment and pigment salt derivative or by adding the individual components of pigment and derivative in the appropriate ratio.

Processes to prepare pigment compositions are illustrated in the following examples:

EXAMPLE 1

81 parts of copper phthalocyanine Pigment Blue 15:3 and 8 parts of copper phthalocyanine sulfonic acid, CuPc $(SO_3H)_n$, (where n=1.5) both in press cake forms, are suspended in 1200 parts of water. The pH of the slurry is adjusted to 9.5–10.0 by the addition of 3 parts of sodium hydroxide. The slurry is agitated for 1 hr at 85–90° C. 11 parts of alkylphenoxypolyalkoxyamine (Surfonamine MNPA-1000 from Hunstman) are then added and the suspension is stirred for 1 hr at 80–90° C. The treated pigment slurry is then filtered and the filtercake is washed with hot water (50–60° C.) until the pH is 7–8. The filtercake is then dried in an oven at 70° C.

20 parts of the treated pigment are added to 80 parts of nitrocellulose vehicle together with 100 parts of ⅛" glass beads, shaken in a Red Devil for 25 min., and diluted further with nitrocellulose vehicle and solvent (ethyl alcohol and ethyl acetate, 2:1). Comparisons of ink properties are given in Table 1 below.

EXAMPLE 2

Comparative

The procure of mixing Pigment Blue 15:3 and copper phthalocyanine sulfonic acid were mixed as described in Example 1 but in place of the polyetheramine a dispersion of dimethyl-ditallow ammonium chloride was used instead (as taught in U.S. Pat. No. 4,047,436). The pigment composition is then filtered, washed, and dried as in Example 1.

EXAMPLE 3

90 parts of the blue CuPc are treated as in Example 1 but 4 parts of $CuPc(SO_3H)_n$ and 6 parts of Surfonamine MNPA-1000 are used. The results are shown in Table 1 below.

EXAMPLE 4

The procedure of Example 1 is followed but 77 parts of the blue CuPc are treated with 10 parts of $CuPc(SO_nH)_n$ and 13 parts of Surfonamine MNPA-1000 are used. The results are given in Table 1 below.

TABLE 1

| Example | Tinting Strength % | Gloss 60° % | Viscosity, Cps Initial | Viscosity, Cps 24 hrs. stored | Transparency Visual | Shade Da |
|---|---|---|---|---|---|---|
| Untreated 15:3 | 91.8 | 25.8 | >500 | — | 1 | Standard |
| 1 | 106.9 | 69.3 | 120 | 48 | 6 | −1.98 |
| Comp 1 | 94.9 | 59.0 | 240 | 1450 | 2 | −0.75 |
| 2 | 96.0 | 62.0 | 200 | 1900 | 3 | −0.65 |
| 3 | 101.1 | 71.0 | 80 | 45 | 5 | −2.53 |

For this table, the strength was measured spectroscopically on film over white paper and the gloss was measured on same film. Viscosity was measured on a Brookfield viscometer. Transparency was a visual rating of a film over black background. Shade Da is from the same measurement technique as strength.

EXAMPLE 5

The procedure in Example 1 is followed, but the pigment used was the alpha crystal form phthalocyanine, (P.B. 15). Compared to the same alpha form pigment treated as described Comparative Example 2, the product of this example has superior gloss and transparency and lower viscosity in a nitrocellulose solvent packaging ink.

EXAMPLE 6

The procedure of Example 1 was repeated but Pigment green 7 was used. Compared to the untreated pigment the product of this example has a tinting strength 115%, higher gloss and transparency and lower viscosity.

EXAMPLE 7

The procedure of Example 2 was repeated, but Pigment Violet 23 was used. In the printing ink, versus untreated pigment the product of this example has 110% strength, higher gloss and improved transparency.

EXAMPLE 8

The procedure of Example 1 was used, but the sulfonated phthalocyanine is replaced by a mono sulfonate derivative of the carbazole violet pigment. Compared to the untreated pigment the product of this example has 110% strength, higher gloss and transparency and a redder shade than the product of Example 7.

EXAMPLE 9

Synthesis of the Additive 194 parts of copper phthalocyanine sulfonic acid (69 parts dry color) in form of presscake is suspended in 1500 parts of water, slurry is heated up to 80–85° C. and agitated for 1 hr. at that temperature. 100 parts of Surfonamine MNPA-1000 are then added and the suspension is stirred for 30 min. at 70–80° C. The slurry is filtered and the filtercake is washed with hot water until the pH 7–8. The filtercake is then dried in an oven at 70° C. over night to give 166.5 parts of dark blue chunks with yield 98.5%.

EXAMPLE 10

200 parts of crude Copper Phthalocyanine, 1000 parts of sodium chloride, and 220 parts of diethyleneglycol are charged into the kneader machine (Volume=3 L), the mixture is heated up to 80–90° C. and kneaded for 5 hours at that temperature. 46 parts of the above additive (the synthesis of which is described in Example 9) is then added and the magma is kneaded for 15 min. The milled magma is then discharged into 4000 parts of water and 40 parts of 35% hydrochloric acid, stirred for 2 hr. at 90–950 C. and the pigment recovered by filtration, and washed with hot water until the filtrate has pH=7–8. The filtercake is dried in an oven at 70° C.

When compared, in NC inks, against the pigment from the above grinding process but omitting the additive of example 8, the pigment of this example has 115% of color strength, superior flow, gloss and transparency.

EXAMPLE 11

The procedure of Example 10 is repeated, but instead of 46 parts of the additive of Example 9, 18.9 parts of CuPc $(SO_3H)_n$ (where n=1.5) and 27.1 parts of Surfonamine MNPA-1000 are added. The final pigment has color strength and other properties close to the pigment from Example 10.

EXAMPLE 12

200 parts of copper phthalocyanine green crude, 600 parts of sodium chloride, 180 parts of diethyleneglycol, and 35 parts of the additive (whose synthesis is described in Example 9) were handled as in Example 10. In the printing ink, compared to a pigment made in the same grinding process but omitting the additive of Example 9, the pigment of this example has 115% strength, higher gloss and transparency.

EXAMPLE 13

86 parts of Pigment Violet 23 in form of presscake were mixed with 6 parts of sulfanilic acid suspended in 1500 parts of water and the slurry is agitated for one hour at 70–80° C. Hydrochloric acid was added to adjust the pH to 1–2. After that, 8 parts of 38.5% solution of sodium nitrite were added. The slurry was rapidly mixed at 70–80° C. for one hour. The resulting material (which is in accordance to the teachings of U.S. Pat. No. 5,837,045) having $C_6H_4SO_3^-Na^+$ groups on the pigment surface was treated with 8 parts Surfonamine MNPA-1000. The slurry was agitated for one hour at 90–95° C. and handled as it was described in Example 1.

When compared with the same pigment omitting the treatment with sulfanilic acid, and only adding the polyetheramine, the pigment of this example in a nitrocellulose ink system demonstrated 110% color strength, more desirable red shade, superior gloss and transparency, and excellent flow properties.

EXAMPLE 14

The procedure of Example 13 was repeated, but Pigment 15:3 was used. The pigment has tinting strength, shade, gloss, transparency, and flow properties similar to Example 2.

EXAMPLE 15

Synthesis of Additive 18 parts of Acetoacet-anilide and 30 parts of Acetoacet-amminobenzene-4-potassium sulfonate are dissolved in 400 parts of water and dilute sodium hydroxide solution to give a pH of 4. These are then precipitated in a finely divided form by the addition of sufficient 35% acetic acid to bring pH to neutral. 25.3 parts of 3,3' di-Chloro Benzidine are tetrazotized by reaction in conventional manner with 68.5 parts of 32% Hydrochloric Acid and 14 parts of Sodium Nitrite in 600 parts of water. This tetrazonium solution is added over a period of two hours to the above fine precipitate, while adding dilute Sodium Hydroxide solution as needed to maintain pH above pH 5 throughout. Then 100 parts of Surfonamine MNPA-1000, an alkyl phenol polyether amine from Huntsman is added. The yellow precipitate is isolated by filtration, washed with water and dried at 70° C. to yield approximately 170 parts of a solid.

EXAMPLE 16

28.5 parts of PY 14 (Sunbrite Yellow 274-1735) and 1.5 parts of the product of Example 1 are added to 80 parts of a grind vehicle (35% nitrocellulose in a 3:1 mixture of ethyl alcohol and ethyl acetate), and dispersed on a shaker mill, using glass beads as grinding media. This ink base is reduced to a finished ink by adding 50 parts of a letdown vehicle (17.5% nitrocellulose in a 2:1 mixture of ethyl alcohol and ethyl acetate) and 7.5 parts of propylene glycol methyl ether. This ink has a very low viscosity (10 cps on rotational viscometer) and shows no thixotropy whereas the untreated product (274-1735) had a viscosity of 80 cps, lower gloss and slight thixotropy.

EXAMPLE 17

21.5 parts of Acetoacet-o-Anisidide are dissolved in dilute sodium hydroxide solution, then precipitated in a finely divided form by the addition of sufficient 35% acetic acid to bring pH to neutral. 20 parts of sodium acetate buffer are added. 16.8 parts of 2-Methoxy 4-Nitro Aniline are then diazotized by reaction in conventional manner with 34.2 parts of 32% Hydrochloric Acid and 7 parts of Sodium Nitrite. This diazonium solution is added over a period of one hour. The yellow pigment slurry is heated to 95° C., then 2 parts of a dyestuff made by azo coupling of diazotized 2-Nitro Aniline-4-Sulfonic Acid with Acetoacet-o-Toluidide is added, followed by the addition of 5 parts of Surfonamine MNPA-1000, an alkyl phenol polyether amine from Huntsman. The precipitate is isolated by filtration, washing and drying at 70° C.

20 parts of this yellow pigment are added to 80 parts of a grind vehicle (35% nitrocellulose in a 3:1 mixture of ethyl alcohol and ethyl acetate), and dispersed on a shaker mill, using glass beads as grinding media. This ink base is reduced to a finished ink by adding 50 parts of a letdown vehicle (17.5% nitrocellulose in a 2:1 mixture of ethyl alcohol and ethyl acetate) and 7.5 parts of propylene glycol methyl ether. This ink exhibits low viscosity and excellent gloss and transparency compared to the same product omitting the addition of Surfonamine.

EXAMPLE 18

85 parts of Pigment Blue 15:3 and 15, parts of the composition of Example 9 are dry blended prior to testing in the nitrocellulose ink as described Example 1. Compared to the untreated parent pigment, this mix had a strength of 105% and much lower viscosity.

EXAMPLE 19

30 parts of Acetoacet-aminobenzene-4-potassium sulfonate are dissolved in 200 parts of water and 100 parts of Surfonamine MNPA-1000 is added. This gives a fine dispersion which is added to a solution containing 18 parts of Acetoacet-anilide and 200 parts of water at pH 4. These are then precipitated in a finely divided form by the addition of sufficient 35% acetic acid to bring pH to 7. 25.3 parts of 3,3' Di-Chloro Benzidine are tetrazotized by reaction in conventional manner with 68.5 parts of 32% Hydrochloric Acid and 14 parts of Sodium Nitrite in 600 parts of water. This tetrazonium solution is added over a period of two hours to the above fine precipitate, while adding dilute Sodium Hydroxide solution as needed to maintain pH above pH 5 throughout. The yellow precipitate is isolated by filtration, washed with water and dried at 70° C. to yield approximately 170 parts of a solid.

EXAMPLE 20

In a first vessel, 25.3 parts of 3,3' Di-Chloro Benzidine are tetrazotized by reaction in conventional manner with 68.5 parts of 32% Hydrochloric Acid and 14 parts of-Sodium Nitrite in 600 parts of water. In a second vessel, 30 parts of Acetoacet-aminobenzene-4-potassium sulfonate are dissolved in 100 parts of water and 100 parts of Surfonamine MNPA-1000 is added. This gives a fine dispersion. In a third vessel 18 parts of Acetoacet-anilide are dissolved in 300 parts of water adjusted to pH 4 with dilute sodium hydroxide. This is then precipitated in a finely divided form by the addition of sufficient 35% acetic acid to bring pH to 7. The sulfonate dispersion in the second vessel is added over 10 minutes to the terazonium solution in the first vessel. This mixture in vessel one is now added to the anilide precipitate in the third vessel over a period of two hours while adding dilute sodium hydroxide solution as needed to maintain pH above pH 5 throughout. The yellow precipitate is isolated by filtration, washed with water and dried at 70° C. to yield the salt of the asymmetric disazo compound with no symmetric bis anilide or bis sulfonate. In contrast, the compounds isolated from Examples 17 and 19 were similar and were composed of 60% of this asymmetric compound and 20% each of the symmetric bis anilide compound and the bis sulfonate compound.

EXAMPLE 21

200 parts of Pigment blue 15:3, 120 parts of diethylene glycol, 18.9 parts of $CuPc(SO_3H)_n$ (where n=1.5), and 27.1 parts of Surfonamine MNPA-1000 are charged into the kneader machine (volume=3L), the mixture is kneaded for 2 hours at 40–50° C. and the milled magma is then handled as it was described in Example 10.

When compared to the control sample, in NC inks, the pigment of this example has 125% of color strength, superior flow, gloss, and transparency.

The invention has been described in terms of preferred embodiments thereof, but is more broadly applicable as will be understood by those skilled in the art. The scope of the invention is only limited by the following claims.

What is claimed is:

1. An etheramine salt of the formula:

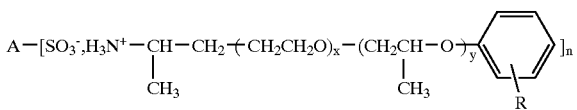

wherein A is an organic pigment residue, x and y each is an integer from 0–30 with $x+y \geq 10$, R is an alkyl group of 2–18 carbon atoms and n is a number between 1 and 4.

2. A pigment composition comprising 1–40 parts of the amine salt of claim 1 and about 100 parts of an organic pigment.

3. The composition of claim 2, wherein the organic pigment is the same as the organic pigment providing residue A.

4. The composition of claim 2, wherein the organic pigment is different from the organic pigment providing residue A.

5. The composition of claim 2, wherein each of the organic pigment and the organic pigment providing residue A is independently selected from the group consisting of phthalocyanine, azo, dioxazine, perylene, quinacridone, and carbazole violet pigment.

6. The composition of claim 2, wherein each of the organic pigment and the organic pigment providing residue A is phthalocyanine.

7. A process for the synthesis of the etheramine salt of claim 1, comprising:

(a) mixing a sulfonic acid derivative of an organic pigment with an ether amine having the following formula:

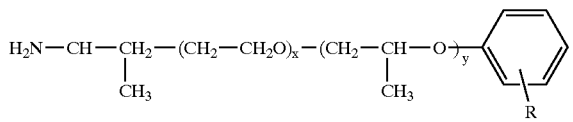

wherein x and y each is an integer from 0–30 with $x+y \geq 10$ and R is an alkyl group of 2–18 carbon atoms; and (b) isolating the etheramine salt by filtration.

8. A process for the synthesis of the pigment composition of claim 2, comprising:

(a) mixing in the presence of an organic pigment, a sulfonic acid salt of organic pigment residue A with an ether amine having the following formula:

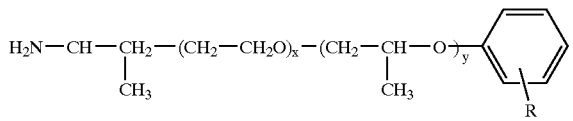

wherein x and y each is an integer from 0–30 with $x+y \geq 10$ and R is an alkyl group of 2–18 carbon atoms; and (b) isolating the pigment composition by filtration.

9. A method for enhancing the performance of a pigment composition containing an organic pigment, comprising enhancing the dispersion of said pigment by adding to 100 parts of said pigment about 1 to 40 parts of an etheramine salt of the formula:

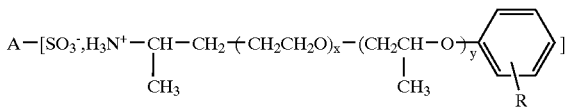

wherein A is an organic pigment residue, x and y each is an integer from 0–30 with $x+y \geq 10$, R is an alkyl group of 2–18 carbon atoms and n is a number between 1 and 4.

10. The method of claim 9, wherein the organic pigment is the same as the organic pigment providing residue A.

11. The method of claim 9, wherein the organic pigment is different from the organic pigment providing residue A.

12. The method of claim 9, wherein each of the organic pigment and the organic pigment providing residue A is independently selected from the group consisting of phthalocyanine, azo, dioxazine, perylene, quinacridone, and carbazole violet pigment.

13. The method of claim 9, wherein each of the organic pigment and the organic pigment providing residue A is phthalocyanine.

* * * * *